US010457017B2

(12) United States Patent
Humfeld et al.

(10) Patent No.: US 10,457,017 B2
(45) Date of Patent: Oct. 29, 2019

(54) METHOD OF FORMING A LAYERED COMPOSITE ASSEMBLY

(71) Applicant: THE BOEING COMPANY, Chicago, IL (US)

(72) Inventors: Keith Daniel Humfeld, Federal Way, WA (US); Kelsi Marie Hurley, Kent, WA (US)

(73) Assignee: The Boeing Company, Chicago, IL (US)

( * ) Notice: Subject to any disclaimer, the term of this patent is extended or adjusted under 35 U.S.C. 154(b) by 783 days.

(21) Appl. No.: 14/563,435

(22) Filed: Dec. 8, 2014

(65) Prior Publication Data

US 2016/0159036 A1    Jun. 9, 2016

(51) Int. Cl.
*B32B 7/08* (2019.01)
*B32B 37/18* (2006.01)
(Continued)

(52) U.S. Cl.
CPC ............... *B32B 7/08* (2013.01); *B29C 65/02* (2013.01); *B29C 65/564* (2013.01);
(Continued)

(58) Field of Classification Search
CPC .... B32B 7/08; B32B 7/07; B32B 3/08; B32B 5/06; B32B 2250/20; B32B 2305/076; B32B 2305/34; B32B 2311/005; B32B 2605/18; B32B 7/04–14; B32B 27/04–06; B32B 27/12; B32B 37/0076–0084; B29C 65/564; B29C 66/1122; B29C 66/45; B29C 65/56; B29C 65/562–564; B29C 65/58–609; F16B 1/0014; F16B 2001/0078;
(Continued)

(56) References Cited

U.S. PATENT DOCUMENTS 2,509,501 A * 5/1950 Huelster ............ A44B 17/0041
24/690
3,058,704 A * 10/1962 Bergstedt ................ B32B 15/08
181/291
(Continued)

FOREIGN PATENT DOCUMENTS

| EP | 0630735 | 12/1994 |
| GB | 2238977 | 12/1990 |
| JP | H10 258471 | 9/1998 |

OTHER PUBLICATIONS

Communication pursuant to Article 94(3) EPC for EP 15 196 206.5-1107, dated Jun. 26, 2019.

*Primary Examiner* — Laura C Powers
*Assistant Examiner* — Larissa E Rowe
(74) *Attorney, Agent, or Firm* — Joseph M. Butscher; The Small Patent Law Group, LLC

(57) ABSTRACT

A layered composite assembly may include a plurality of composite fiber layers stacked onto one another. Each of the plurality of composite fiber layers may include a main body including a plurality of composite fibers. The main body may be pre-impregnated with at least one resin. Each composite fiber layer also includes a plurality of layer-securing pins secured to the main body. The layer-securing pins are configured to mechanically connect the main body to an adjacent composite fiber layer.

15 Claims, 6 Drawing Sheets

(51) Int. Cl.
*F16B 1/00* (2006.01)
*B29C 65/56* (2006.01)
*B32B 5/06* (2006.01)
*B32B 5/26* (2006.01)
*B32B 3/08* (2006.01)
*B29C 65/02* (2006.01)
*B29C 70/54* (2006.01)
*B29C 65/00* (2006.01)
*B29C 70/24* (2006.01)
*B29C 65/18* (2006.01)

(52) U.S. Cl.
CPC .......... *B29C 66/1122* (2013.01); *B29C 66/45* (2013.01); *B29C 66/721* (2013.01); *B29C 66/73752* (2013.01); *B29C 66/73941* (2013.01); *B29C 66/83431* (2013.01); *B29C 70/24* (2013.01); *B29C 70/543* (2013.01); *B32B 3/08* (2013.01); *B32B 5/06* (2013.01); *B32B 5/26* (2013.01); *B32B 37/18* (2013.01); *F16B 1/0014* (2013.01); *B29C 65/18* (2013.01); *B32B 2250/20* (2013.01); *B32B 2250/40* (2013.01); *B32B 2260/023* (2013.01); *B32B 2260/046* (2013.01); *B32B 2305/076* (2013.01); *B32B 2305/34* (2013.01); *B32B 2311/005* (2013.01); *B32B 2605/18* (2013.01)

(58) Field of Classification Search
CPC ...... F16B 5/04–045; F16B 5/07; F16B 13/00; F16B 13/04; F16B 17/00–008; F16B 19/00–004; F16B 21/00–125; F16B 21/16–205; A41F 1/002; A45C 13/1069
USPC ........................................................ 428/223
See application file for complete search history.

(56) References Cited

U.S. PATENT DOCUMENTS

| | | | |
|---|---|---|---|
| 4,458,395 A * | 7/1984 | Aoki | A45C 13/1069 |
| | | | 24/303 |
| 5,667,859 A | 9/1997 | Boyce | |
| 5,876,540 A * | 3/1999 | Pannell | B29C 65/344 |
| | | | 156/272.4 |
| 7,032,282 B2 * | 4/2006 | Powell | A44B 18/0007 |
| | | | 24/442 |
| 2003/0066589 A1* | 4/2003 | Benson | B29C 65/564 |
| | | | 156/92 |
| 2005/0042023 A1* | 2/2005 | Jones | B29C 65/564 |
| | | | 403/267 |
| 2008/0193709 A1 | 8/2008 | Han | |
| 2008/0286564 A1 | 11/2008 | Tsotsis | |
| 2010/0154181 A1* | 6/2010 | Flanigan | B29C 39/003 |
| | | | 24/453 |
| 2013/0149501 A1* | 6/2013 | Pacchione | B29C 65/364 |
| | | | 428/172 |
| 2014/0059813 A1 | 3/2014 | Soeflker | |

* cited by examiner

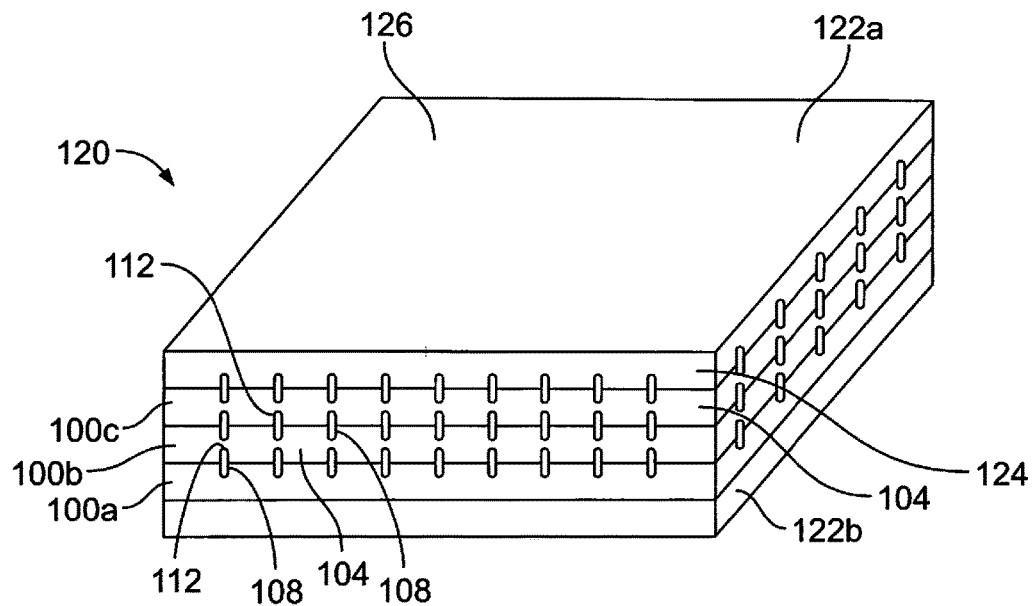
FIG. 4
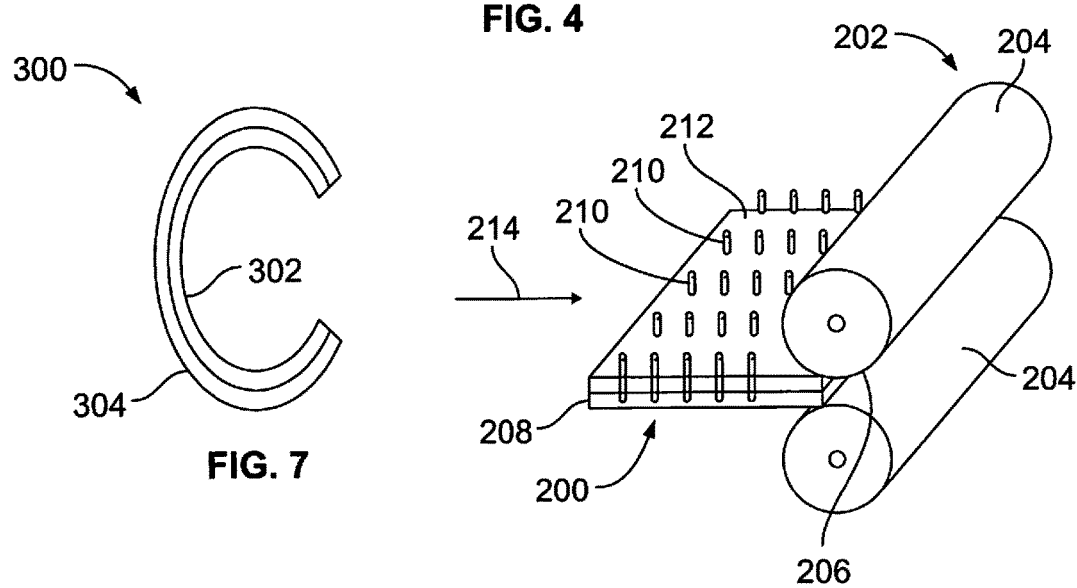
FIG. 7
FIG. 5
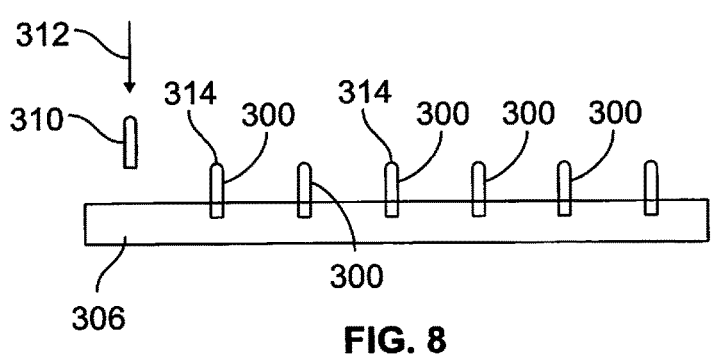
FIG. 8

METHOD OF FORMING A LAYERED COMPOSITE ASSEMBLY

BACKGROUND OF THE DISCLOSURE

Embodiments of the present disclosure generally relate to methods of forming a composite layer assembly, such as may be used to form portions of an aircraft.

Various structures are formed from composite materials. For example, portions of aircraft, such as wings, may be formed from composite materials. The composite material may be or include a polymer matrix reinforced with fibers. The fibers may be bound together with polymers, such as epoxy. Known fibers include glass, carbon, basalt, aramid, or the like.

In many instances, however, the layers of composite material are susceptible to separating from one another when subjected to sufficient force. Stresses and strains exerted into the composite materials may cause one or more of the fiber layers to fray, crack, or otherwise separate.

To reduce the likelihood of composite layers separating, the composite layers may be sewn or stitched together. After the composite layers are stacked, a stitching tool may be used to secure the layers together through a stitching or sewing process that includes a needle piercing the layers and tying the layers together through one or more stitches that pass through all of the layers. However, various structures are not easily engaged by a stitching tool. For example, the composite layers may reside in or otherwise define confined spaces that are not easily accessed by a stitching tool. Further, a needle or other such component of a stitching or sewing device may damage one or more of the layers, such as a laminate layer, which may render the resulting component unsafe or otherwise unusable.

In general, the various layers within a composite material may be stitched together through an entire thickness of an uncured composite assembly. As noted, however, the process of securing stitches through an entire thickness of the composite material often damages a laminate layer, such as where a stitching needle pierces through the laminate.

As such, a need exists for an efficient method of securing composite layers together. Further, a need exists for a method of securing composite layers together during a curing process that does not damage the composite layers.

SUMMARY OF THE DISCLOSURE

Certain embodiments of the present disclosure provide a composite fiber layer that may include a main body including a plurality of composite fibers, and a plurality of layer-securing pins secured to the main body. The plurality of layer-securing pins may be configured to mechanically connect the main body to another composite fiber layer. The main body may be pre-impregnated with at least one resin. The main body may include first and second opposed surfaces separated by a thickness. Each of the layer-securing pins may extend through only one of the first or second opposed surfaces. Each of the plurality of layer-securing pins may include a linear structure, such as a single linear metal segment.

Each of the layer-securing pins may include a linear exposed end extending outwardly from the main body. The linear exposed end is configured to penetrate into another composite fiber layer.

In at least one embodiment, each of the layer-securing pins may be formed of a bimetallic alloy having first and second portions that exhibit different coefficients of thermal expansion. In at least one embodiment, each of the layer-securing pins may be formed of a shape memory alloy. Each of the layer-securing pins may be curled at a first temperature, and configured to be straightened at a second temperature that differs from the first temperature. Each of the layer-securing pins may be secured to the main body in a straightened orientation. Each of the securing pins is configured to transition to a curled orientation to hook onto one or more of the plurality of composite fibers and one or more composite fibers of an adjacent composite fiber layer.

In at least one embodiment, each of the layer-securing pins may include an annular ring, and a plurality of legs extending from the annular ring. The annular ring is exposed through an outer surface of the main body. The legs extend into the main body. Each of the legs may be formed of two different materials, such as a bimetallic material. The annular ring is configured to abut into and bond to another annular ring of another composite fiber layer.

Certain embodiments of the present disclosure provide a layered composite assembly. The layered composite assembly may include a plurality of composite fiber layers stacked onto one another. Each of the composite fiber layers may include a main body including a plurality of composite fibers. The main body may be pre-impregnated with at least one resin. Each of the composite fiber layers may also include a plurality of layer-securing pins secured to the main body. The layer-securing pins are configured to mechanically connect the main body to an adjacent composite fiber layer.

Certain embodiments of the present disclosure provide a method of forming a layered composite assembly. The method may include stacking a plurality of composite fiber layers, curing the plurality of composite fiber layers to form the layered composite assembly, and mechanically connecting the plurality of layer-securing pins of each of the plurality of composite fiber layers with another of the plurality of composite fiber layers.

In at least one embodiment, one or both of the mechanically connecting and the curing operations may include exposing the plurality of composite fibers layers to a change in one or both of temperature or pressure, and transitioning the plurality of layer-securing pins between straightened and curled orientations through the exposing operation.

In at least one embodiment, one or both of the mechanically connecting and the curing operations may include abutting exposed portions of rings of the plurality of layer-securing pins of adjacent ones of the plurality of composite fiber layers together, and bonding the abutting exposed portions of the rings of the plurality of layer-securing pins of the adjacent ones of the plurality of composite fiber layers together.

BRIEF DESCRIPTION OF THE DRAWINGS

FIG. 4 illustrates a perspective top view of a layered composite assembly, according to an embodiment of the present disclosure.

FIG. 5 illustrates a simplified perspective lateral view of a composite fiber layer being formed through a calendaring process, according to an embodiment of the present disclosure.

FIG. 7 illustrates a lateral view of a layer-securing pin, according to an embodiment of the present disclosure.

FIG. 8 illustrates a lateral view of a layer-securing pin being inserted into a composite fiber layer, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a layered composite assembly that includes a plurality of composite fiber layers secured together. Each composite fiber layer may include one or more layer-securing pins. The layer-securing pins of each composite fiber layer extend into the composite fiber layer and include portions that are configured to securely attach to a portion of another composite fiber layer. As such, the layer-securing pins are configured to mechanically secure each composite fiber layer to another composite fiber layer. Each layer-securing pin may only extend between two adjacent composite fiber layers, in contrast to a stitch, string, rope, or suture that passes through all of the layers (such as via a stitching needle).

Embodiments of the present disclosure provide composite fiber layers that are configured to form a layered composite assembly that resists layer separation. The resulting layered composite assembly is strong and robust.

Figure 1:
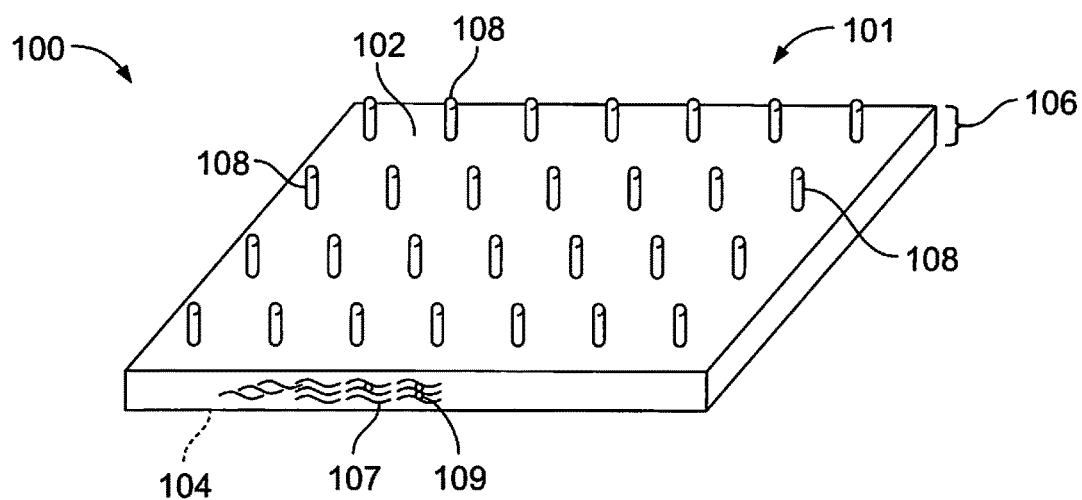
FIG. 1 illustrates a perspective top view of a composite fiber layer, according to an embodiment of the present disclosure.

FIG. 1 illustrates a perspective top view of a composite fiber layer 100, according to an embodiment of the present disclosure. The fiber layer 100 may be a flexible, resilient sheet, ply, or panel of composite material. In at least one embodiment, the composite fiber layer 100 may be a pre-impregnated ("pre-preg") composite fiber layer. The pre-preg composite fiber layer 100 may include a matrix material, such as epoxy, resin, and/or the like. The composite fiber layer 100 may include a plurality of fibers that may be aligned and/or woven together, for example. The epoxy and/or resin may be used to bond the woven fibers together.

The composite fiber layer 100 includes a main body 101 having opposed first and second surfaces, such as top and bottom planar surfaces 102 and 104, respectively, separated by a thickness 106. The thickness 106 may be, for example, 250 microns. Alternatively, the thickness 106 may be greater or lesser than 250 microns. The main body 101 may be formed of composite fibers 107 (such as carbon fibers, fiberglass, or the like) aligned and/or woven together. The composite fibers 107 may be bonded together through epoxy 109, for example. For the sake of clarity, only a portion of the composite fibers 107 and epoxy 109 are shown.

The composite fiber layer 100 also includes a plurality of layer-securing pins 108 extending upwardly from the top surface 102. Each layer-securing pin 108 may be a linear structure, such as a single straight segment formed of metal, such as a stake, staple, cylinder, spike, or the like that extends into the main body 101.

Figure 2:
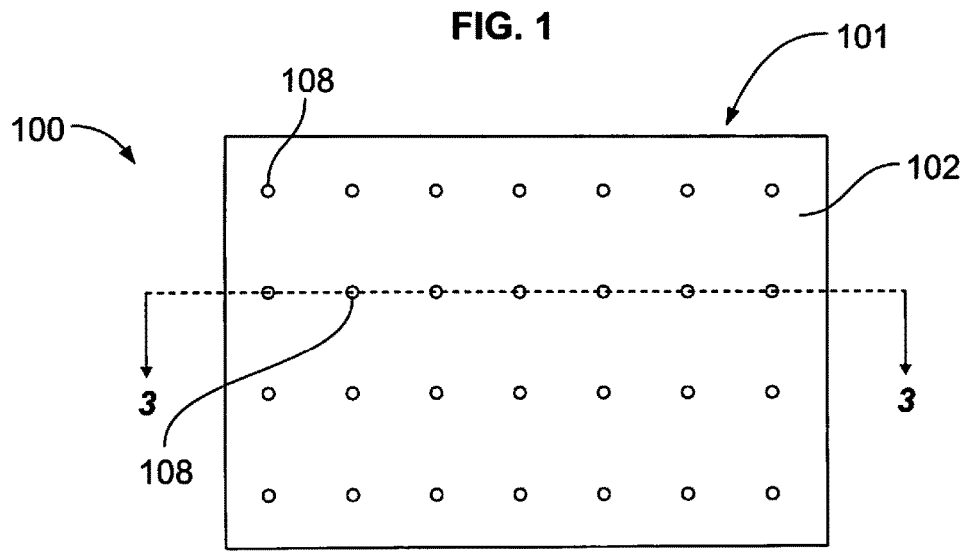
FIG. 2 illustrates a top plan view of a composite fiber layer, according to an embodiment of the present disclosure.

FIG. 2 illustrates a top plan view of the composite fiber layer 100, according to an embodiment of the present disclosure. As shown, the composite fiber layer 100 may include a plurality of layer-securing pins 108 regularly spaced in rows and columns. Alternatively, the layer-securing pins 108 may not be regularly spaced in defined rows and columns. Also, alternatively, the composite fiber layer 100 may include more or less layer-securing pins 108 than shown.

Figure 3:
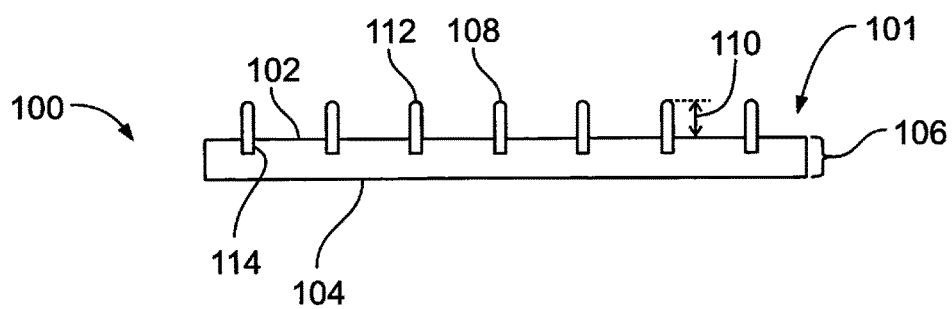
FIG. 3 illustrates a transverse cross-sectional view of a composite fiber layer through line 3-3 of FIG. 2, according to an embodiment of the present disclosure.

FIG. 3 illustrates a transverse cross-sectional view of the composite fiber layer 100 through line 3-3 of FIG. 2, according to an embodiment of the present disclosure. For the sake of clarity, FIG. 3 does not include cross-hatching. Each layer-securing pin 108 may extend above the top surface 102 a distance 110 that is less than the thickness 106 of the composite fiber layer 100. As such, a linear exposed end 112 of each layer-securing pin 108 extends above the top surface 102, while an embedded end 114 is embedded within the fibers of the main body 101. The embedded end 114 may not extend through the bottom surface 104. Alternatively, the embedded end 114 may extend through the bottom surface 104. In at least one other embodiment, separate and distinct layer-securing pins 108 may extend through the bottom surface 104.

FIG. 4 illustrates a perspective top view of a layered composite assembly 120, according to an embodiment of the present disclosure. The layered composite assembly 120 includes a plurality of composite fiber layers 100a, 100b, and 100c secured together. One or more laminate layers 122a and 122b may be positioned over and/or around the composite fibers layers 100. The layered composite assembly 120 may include more or less composite fiber layers 100a, 100b, and 100c than shown.

The exposed ends 112 of the layer-securing pins 108 of the composite fiber layer 100a extend into and through the bottom surface 104 of the composite fiber layer 100*b*. The exposed ends 112 may pierce the bottom surface 104 and/or secure into fiber portions of the composite fiber layer 100*b*, thereby forming a secure connection between the composite fibers layers 100*a* and 100*b* that resists separation. Notably, the exposed ends 112 may not extend through the top surface of the composite fiber layer 100*b*. Similarly, the exposed ends 112 of the layer-securing pins 108 of the composite fiber layer 100*b* extend into and through the bottom surface 104 of the composite fiber layer 100*c*. Further, the exposed ends 112 of the layer-securing pins 108 of the composite fiber layer 100*c* extend into and through a bottom surface 124 of the laminate layer 122*a*, thereby forming a secure connection therebetween. The layer-securing pins 108 may not extend through an entire thickness of the laminate layer 122*a*. As such, the outer surface 126 of the laminate layer 122*a* remains free of cracks or holes, which provides the layered composite assembly 120 with increased structural integrity.

Alternatively, the layered composite assembly 120 may include more or less laminate layers than shown. For example, the layered composite assembly 120 may include only one of the laminate layers 122*a* or 122*b*. Also, alternatively, the layered composite assembly 120 may not include any laminate layers.

After the layered composite assembly 120 is formed as shown in FIG. 4, the layered composite assembly 120 may be cured, such as within an autoclave. The curing process causes resin impregnated within the composite fiber layers 100*a*-100*c* to undergo a material transition (such as by melting) and flow therethrough. By curing, the resin that permeates the layers cools and hardens, thereby forming a secure bond between the composite fiber layers 100*a*-100*c*.

During lamination, several composite fibers layers may be stacked onto one another. When the layered composite assembly 120 is debulked and/or cured, the temperature is increased to cause the resin to flow. Autoclave pressure compacts the laminate. Alternatively, or additionally, the laminate may be compacted through vacuum pressure. The space previously occupied by fiber and air is then occupied by fiber and resin, and the space previously occupied by a resin layer may then be available for the next layer. For example, during compaction, air is forced out from within and between each layer, eliminating all space once occupied by air so that the volume of the laminate includes the fiber and matrix material. Because the process may occur over a short period of time at the same temperature as the layer-securing pins 108 were originally added to the composite fiber layers, the layer-securing pins 108 may be straight and penetrate through at least a portion of a composite fiber layer. If formed of a bimetallic alloy with portions having different coefficients of thermal expansion, as the temperature continues to increase, the layer-securing pins 108 may curl around fibers in adjacent composite fiber layers.

FIG. 5 illustrates a simplified perspective lateral view of a composite fiber layer 200 being formed through a calendaring process, according to an embodiment of the present disclosure. A calendaring system 202 may include opposed rollers 204 separated by a gap 206. A main body 208 may be positioned underneath a layer of layer-securing pins 210, which may be positioned within a layer of resin film 212, for example. The layers of material are fed into the gap 206 in the direction of arrow 214. The rollers 204 and 206 apply pressure and heat to the layers of material, which infuses the resin film 212 into the main body 208, and drives the securing pins 210 into the main body 208 to a desired depth, as described above.

Alternatively, the layer-securing pins 210 may be secured to the main body 208 through various other processes. For example, each layer-securing pin 210 may be individually driven into the main body 208 through a handheld tool, akin to a rivet gun. Further, the layer-securing pins 210 may be driven into the main body 208 in one or more groups through the use of a tool, such as a press.

Figures 6, 10:
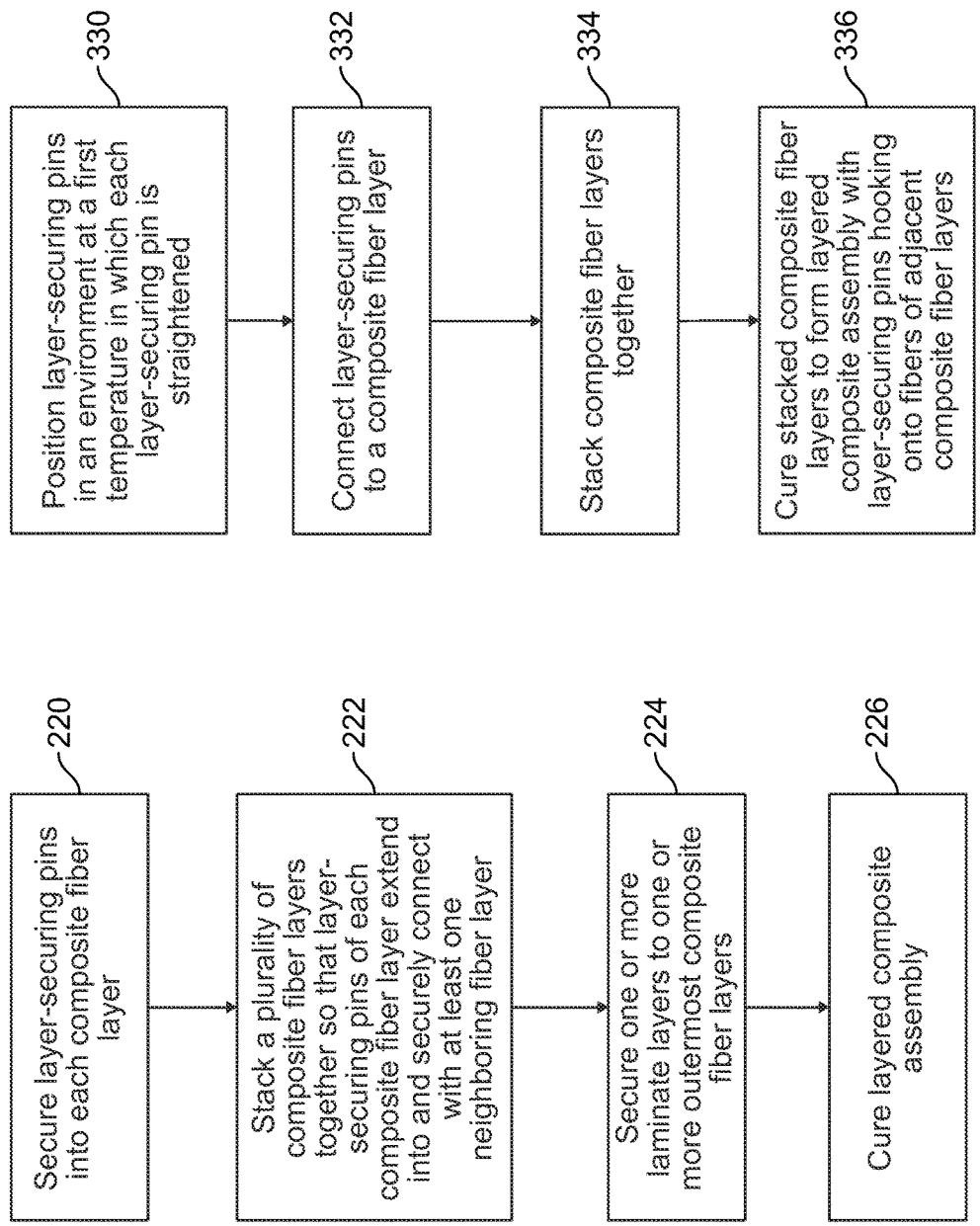
FIG. 6 illustrates a flow chart of a method of forming a layered composite assembly, according to an embodiment of the present disclosure.
FIG. 10 illustrates a flow chart of a method of forming a layered composite assembly, according to an embodiment of the present disclosure.

FIG. 6 illustrates a flow chart of a method of forming a layered composite assembly, according to an embodiment of the present disclosure. At 220, layer-securing pins are secured into a composite fiber layer. For example, multiple layer-securing pins may be driven into a main body of a composite fiber layer. Separate and distinct layer-securing pins are secured into each composite fiber layer, which are then used to form a layered composite assembly.

At 222, a plurality of composite fiber layers are stacked together so that layer-securing pins of each composite fiber layer extend into and securely connect with at least one neighboring composite fiber layer. A neighboring composite fiber layer is one that is immediately adjacent to a surface of a particular composite fiber layer.

At 224, one or more laminate layers may be secured to one or more outermost composite fiber layers. Alternatively, 224 may be omitted. At 226, the layered composite assembly, which includes a plurality of composite fiber layers secured together through a plurality of layer-securing pins, is cured, such as within an autoclave.

FIG. 7 illustrates a lateral view of a layer-securing pin 300, according to an embodiment of the present disclosure. The layer-securing pin 300 may be formed of bimetallic having an inner portion 302 formed of a first metal, and an outer portion 304 formed of a second metal that differs from the first metal. At a first temperature and/or pressure, the inner portion 302 shrinks more than the outer portion 304, as shown, which causes the outer portion 304 to bend in response thereto. When the layer-securing pin 300 is subjected to a second temperature and/or pressure that differs from the first temperature and/or pressure (for example, the second temperature may be cooler than the first temperature), the inner portion 302 expands more than the outer portion 304, and the layer-securing pin 300 may be straightened to form a linear pin, such as shown and described with respect to FIGS. 1-4. Once straightened, the layer-securing pin 300 may be secured to a main body of a composite fiber layer, as described above.

The layer-securing pin 300 is set in a straightened orientation as it is inserted into a main body of a composite fiber layer. The resulting assembly is then subjected to an increased temperature, such as within an autoclave, so that the layer-securing pin 300 transitions to a curled orientation (as shown in FIG. 7) to hook onto and/or into one or more of carbon fibers of the main body, and one or more carbon fibers of an adjacent, neighboring composite fiber layer.

Each layer-securing pin 300 may have a thickness of 5 microns, for example, in order to be configured to penetrate a fiber bed of a composite fiber layer without breaking or otherwise damaging any of the fibers. Further, each layer-securing pin 300 may have a length of 40 microns, for example. In this manner, the resulting curl that occurs with temperature variation captures (for example, hooks onto) a plurality of fibers within a composite fiber layer. The layer-securing pin 300 may be formed of one-way or two-way bimetallic shape memory alloys. Alternatively, the layer-securing pin 300 may be greater or lesser than 5 microns thick, and may be greater or lesser than 40 microns long.

Alternatively, the layer-securing pin 300 may be formed of a shape memory alloy. The layer-securing pin 300 may be formed in a curled shape at a first temperature, and then is cooled to a second temperature that differs from the first temperature. The layer-securing pin 300 may be mechanically straightened at the second temperature.

A shape memory alloy is an alloy that has an original shape. When deformed, the shape memory alloy returns to the original shape upon a change in temperature. For example, after being deformed, the shape memory alloy returns to the original shape as it is subjected to an increasing temperature. Alternatively, the shape memory alloy may return to the original shape as it is subjected to a decreasing temperature.

Examples of shape memory alloys include nickel-titanium, and copper-aluminum-nickel. Other examples of shape memory alloys may be formed from alloys of zinc, copper, gold, and iron. Nickel-titanium, for example, changes from austenite to martensite upon cooling.

The shape memory alloy may be a one-way shape memory alloy, or a two-way shape memory alloy. For example, when a one-way shape memory alloy is in a cold state, the shape memory alloy may be bent or stretched and retain such shape until heated above a transition temperature. Upon heating, the shape changes to the original shape. When the one-way shape memory alloy cools, it remains in the original shape until it is actively deformed again.

In contrast, a two-way shape memory alloy actively transitions between two different shapes. For example, at a low temperature, the two-way shape memory alloy is in a first shape, while at a high temperature, the two-way shape memory is in a second shape that differs from the first shape. The changing shapes are obtained through the change in temperature without an external force being exerted into the material.

FIG. 8 illustrates a lateral view of a layer-securing pin 300 being inserted into a composite fiber layer 306, according to an embodiment of the present disclosure. The layer-securing pins 300 are subjected to a temperature at which they are pliable and may be bent to a straight position, as shown. The layer-securing pins 300 are then urged into the composite fiber layer 306 in the direction of arrow 312. After the layer-securing pins 300 are secured to the composite fiber layer 306, another composite fiber layer is stacked onto the composite fiber layer 306 so that exposed ends 314 of the layer-securing pins 300 are urged into the upper composite fiber layer. After all composite fiber layers are stacked, the resulting assembly is heated to the first temperature, which causes the layer-securing pins 300 to inwardly curl, as shown in FIG. 7, thereby securely hooking onto and/or into carbon fibers within adjacent stacked composite fiber layers, which provides a robust and secure mechanical connection therebetween.

As described above, each layer-securing pin 300 is inserted in a straightened orientation, state, or position 310. The layer-securing pins 300 may be inserted into a particular composite fiber layer 306 when pre-impregnated resin is pliable or fluid. Each layer-securing pin 300 may be formed of two materials having mismatched coefficients of thermal expansion (such as a bimetallic strip). For example, during pre-pregging operations, the layer-securing pins may be added to the composite fibers layers 306 at 170° F., which may cause each layer-securing pin 300 to be in a straightened orientation. During laminate cure, the pre-impregnated resin is pliable at such temperature. As the temperature increases, the layer-securing pins 300 curl (such as shown FIG. 7). Generally, during a cure, the resin generally retains a low viscosity until a temperature range of 290°-350° F. As such, there may generally be a 120°-180° F. temperature range for each layer-securing pin 300 to curl.

Figure 9:
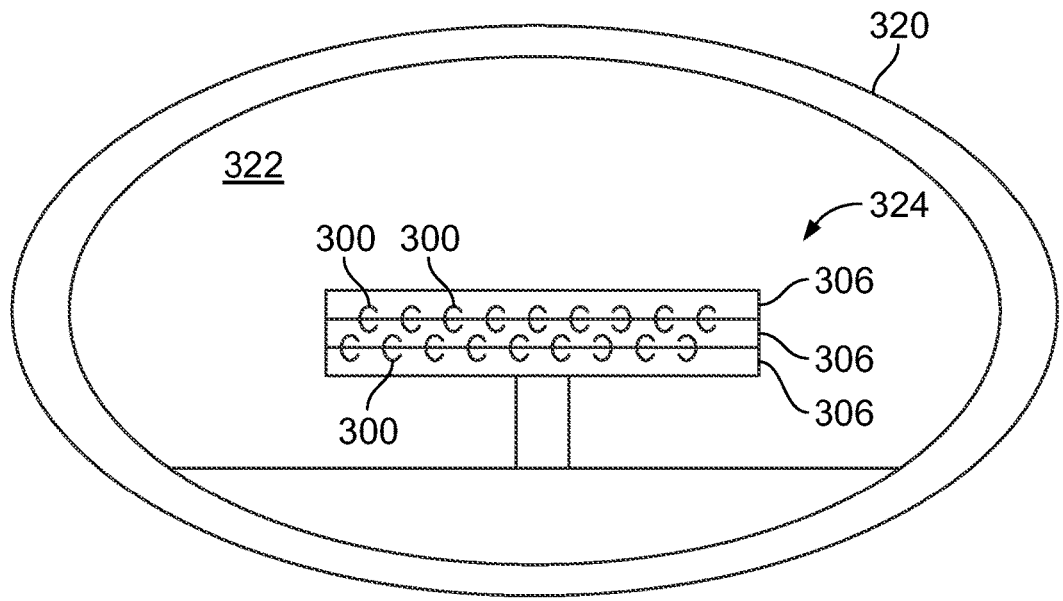
FIG. 9 illustrates a simplified internal view of a curing device having an internal chamber that contains a layered composite assembly, according to an embodiment of the present disclosure.

FIG. 9 illustrates a simplified internal view of a curing device 320 having an internal chamber 322 that contains a layered composite assembly 324, according to an embodiment of the present disclosure. The curing device 320 may be an autoclave, for example. The layered composite assembly 324 includes a plurality of stacked composite fiber layers 306. As the curing device 320 heats the layered composite assembly 324, the layer-securing pins 300 inwardly curl, thereby hooking onto and/or into carbon fibers within adjacent composite fiber layers 306. At the same time, the curing device 320 cures the composite fiber layers 306 together, such as through resin curing. After the curing process, the layer-securing pins 300 being securely hooked between adjacent composite fiber layers 306.

FIG. 10 illustrates a flow chart of a method of forming a layered composite assembly, according to an embodiment of the present disclosure. At 330, layer-securing pins are positioned in an environment at a first temperature in which the layer-securing pins are pliable and may be straightened. Then, at 332, the straightened layer-securing pins are connected to a composite fiber layer. Each composite fiber layer may be formed in a similar manner.

At 334, the composite fiber layers are stacked together, such that exposed ends of straightened layer-securing pins of one composite fiber layer penetrate into and through a surface of an adjacent composite fiber layer. Then, at 336, the stacked composite fiber layers are cured, such as at a second temperature, which causes the straightened layer-securing pins to curl and hook onto fibers within adjacent composite fiber layers.

Figure 11:
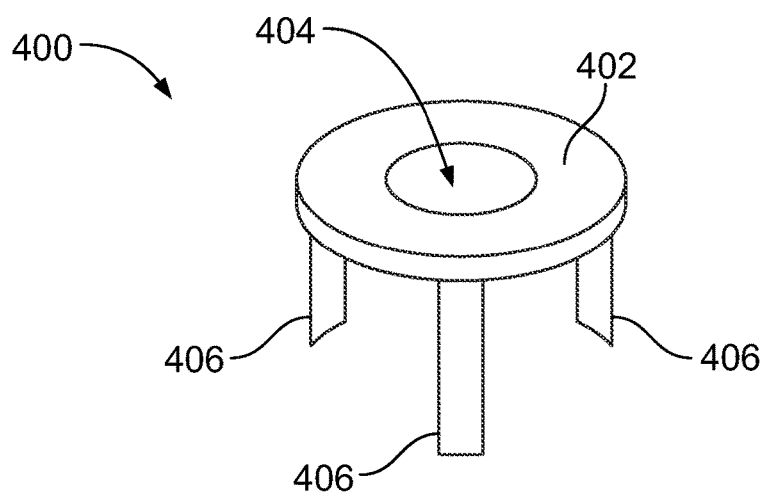
FIG. 11 illustrates a perspective top view of a layer-securing pin, according to an embodiment of the present disclosure.

FIG. 11 illustrates a perspective top view of a layer-securing pin 400, according to an embodiment of the present disclosure. The layer-securing pin 400 includes an annular ring 402 defining a central passage 404. A plurality of legs 406 extend downwardly from a lower surface of the annular ring 402. Each leg 406 may be a cylindrical post, for example. The layer-securing pin 400 may include more or less legs 406 than shown. The cylindrical passage 404 allows resin to flow through the layer-securing pin 400 during a curing process. Alternatively, the annular ring 402 may be a disc without a central passage.

The legs 406 may be formed of one-way or two-way shape memory alloys. Each leg 406 may have a thickness of 5 microns, for example, in order to penetrate a fiber bed of a composite fiber layer without breaking or otherwise damaging fibers. Further, each leg 406 may have a length of 40 microns, for example. Therefore, if the legs 406 are formed of a bimetallic material or shape memory alloys, such as described above with respect to FIGS. 7-10, the resulting curl captures (for example, hooks onto and/or into) a plurality of fibers within a composite fiber layer. Alternatively, each leg may have a thickness that is greater or lesser than 5 microns, and a length that is greater or lesser than 40 microns.

Figure 12:
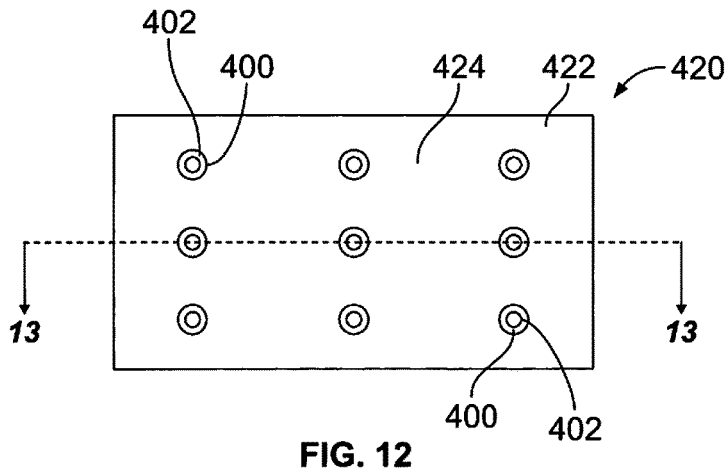
FIG. 12 illustrates a top plan view of a composite fiber layer, according to an embodiment of the present disclosure.

FIG. 12 illustrates a top plan view of a composite fiber layer 420, according to an embodiment of the present disclosure. The composite fiber layer 420 may include a main body 422, which may include carbon fibers and epoxy, as described above. Top surfaces of the annular rings 402 of each layer-securing pin 400 may be exposed through and flush with a top surface 424 of the main body 422. The composite fiber layer 420 may include more or less layer-securing pins 400 than shown.

Figure 13:
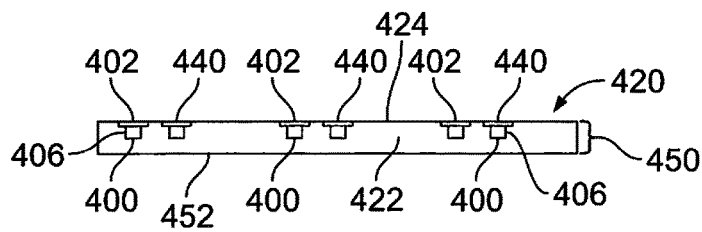
FIG. 13 illustrates a transverse cross-sectional view of a composite fiber layer through line 13-13 of FIG. 12, according to an embodiment of the present disclosure.

FIG. 13 illustrates a transverse cross-sectional view of the composite fiber layer 420 through line 13-13 of FIG. 12, according to an embodiment of the present disclosure. For the sake of clarity, FIG. 13 does not include cross-hatching. As shown, the top surfaces 440 are exposed through the top surface 424 of the main body 422. The legs 406 penetrate into the main body 422 to a depth that does not exceed a thickness 450 of the main body 422. As such, the legs 406 are entirely contained within the main body 422 and do not extend through a lower surface 452 of the main body 422.

Figure 14:
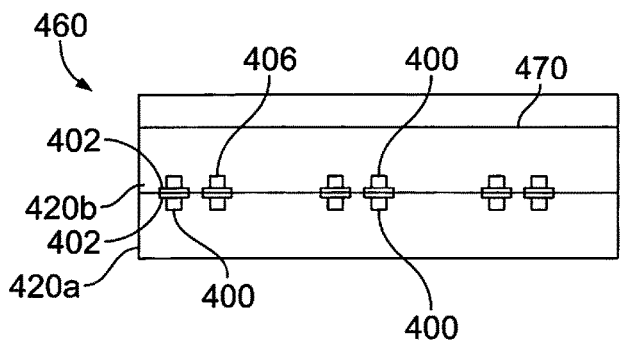
FIG. 14 illustrates a transverse cross-sectional view of a layered composite assembly, according to an embodiment of the present disclosure.

FIG. 14 illustrates a transverse cross-sectional view of a layered composite assembly 460, according to an embodiment of the present disclosure. For sake of clarity, FIG. 14 does not include cross-hatching. The layered composite assembly 460 may include a plurality of stacked composite fiber layers 420a and 420b. The composite fiber layer 420b is inverted with respect to the composite fiber layer 420 and stacked thereon such that the exposed surfaces of the rings 402 abut into one another.

Figure 15:
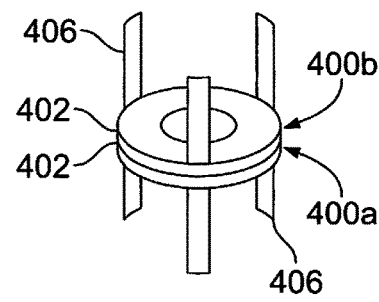
FIG. 15 illustrates a perspective top view of bonded layer-securing pins, according to an embodiment of the present disclosure.

FIG. 15 illustrates a perspective top view of bonded layer-securing pins 400a and 400b, according to an embodiment of the present disclosure. As shown, the rings 402 of opposed pins 400a and 400b abut into one another. Referring to FIGS. 14 and 15, the rings 402 bond to one another at the interface therebetween, which forms a secure connection between the pins 400a and 400b, and, as a result, between the adjacent composite fiber layers 420a and 420b.

The layer-securing pins 400 are arranged such that the rings 402 are exposed on the surface of the main bodies 422 and the legs 406 are embedded within the main bodies 422. The legs 406 may be curled around fibers within a particular main body 422. When each composite fiber layer 420 is laid up, respective rings 402 in adjacent composite fiber layers 420 may abut into one another, and a chemical reaction (such as a two-part adhesive) may bind the layer-securing pins 400 together, as shown in FIG. 15, in particular. Accordingly, each main body 422 (such as a ply or sheet) is strongly bound to a neighboring main body 422.

The layer-securing pins 400 improve the bonding between adjacent composite fiber layers. The abutting relationship of the rings 402 at the interface of adjacent composite fiber layers reacts to form a robust securing bond. If formed of a bimetallic shape memory alloy, the legs 406 of one layer-securing pin curl around the fibers in one composite fiber alloy, while the legs 406 of the other pin curl around the fibers in the adjacent composite fiber alloy. Therefore, the abutting layer-securing pins 400a and 400b provide a mechanical tie or connection between the fibers in adjacent composite fiber layers.

The layered composite fiber layer 460 may also include one or more laminate layers 470. Alternatively, the layered composite fiber layer 460 may not include a laminate layer.

Figure 16:
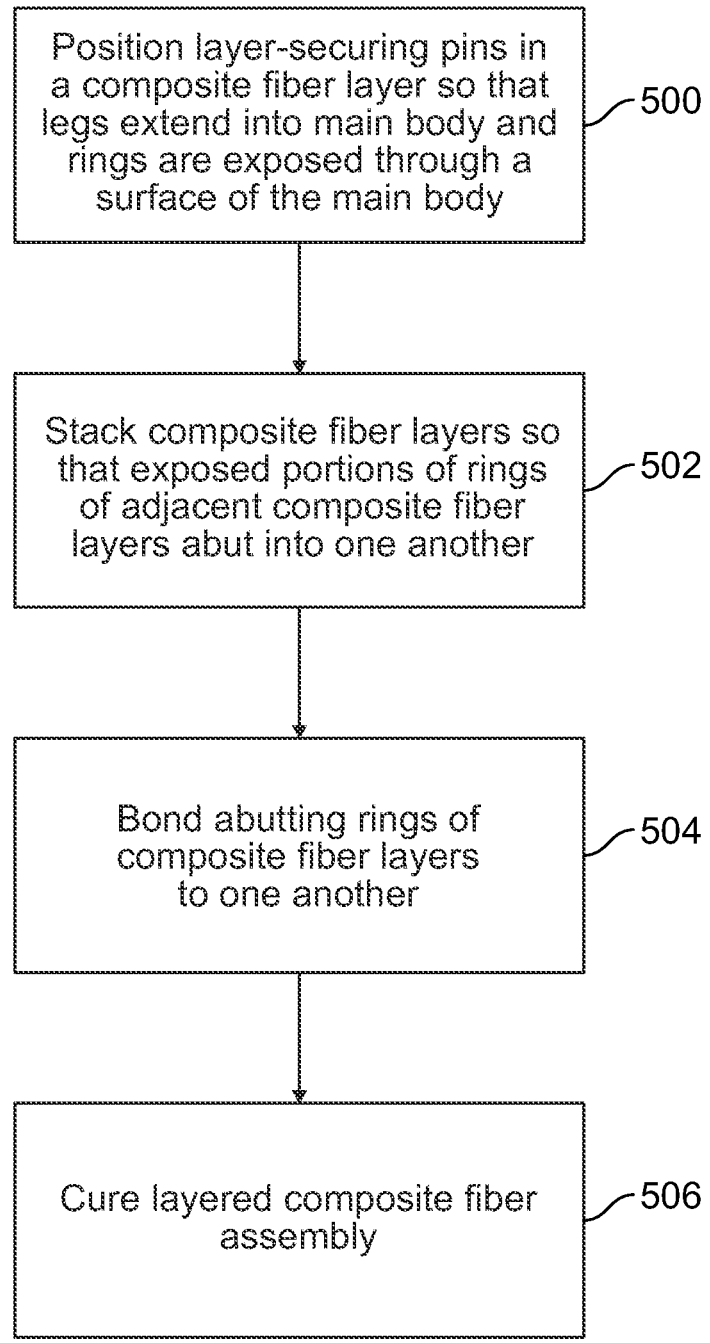
FIG. 16 illustrates a flow chart of a method of forming a layered composite assembly, according to an embodiment of the present disclosure.

FIG. 16 illustrates a flow chart of a method of forming a layered composite assembly, according to an embodiment of the present disclosure. At 500, layer-securing pins are positioned in a composite fiber layer so that legs extend into a main body of the composite fiber layer and rings are exposed through a surface of the main body. Multiple composite fiber layers are formed in such a manner.

At 502, composite fiber layers are stacked so that exposed portions of rings of adjacent composite fiber layers abut into one another. At 504, the abutting rings of adjacent composite fiber layers are bonded to one another, such as during an initial curing process. At 506, the composite fiber assembly is further cured to complete the curing process.

Embodiments of the present disclosure provide a layered composite assembly having composite fiber layers, such as plies or sheets, adjacent ones of which are robustly mechanically connected to one another through layer-securing pins.

It has been found that embodiments of the present disclosure provide layered composite assemblies defined by improved $G_{IC}$ and $G_{IIC}$ properties, for example, which relate to the energy required per unit area to extend a crack in each of two failure modes.

Embodiments of the present disclosure provide layered composite assemblies that are less susceptible to damage than prior known assemblies. A needle is not used to thread stitches through the assemblies. As such, embodiments of the present disclosure are not susceptible to puncture damage, as may be caused by a needle threading stitches through an assembly. Embodiments of the present disclosure provide composite fiber layers and resulting assemblies that may have any thickness, shape, or contour, including arcuate shapes that are generally not amenable to being stitched through standard stitching or sewing processes.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A composite fiber layer that couples to another composite fiber layer, the composite fiber layer comprising:
   a main body including a plurality of composite fibers; and
   a plurality of layer-securing pins secured to the main body, wherein the plurality of layer-securing pins are separate and distinct from one another, wherein the plurality of layer-securing pins are configured to mechanically connect the main body to the other composite fiber layer, wherein each of the plurality of layer-securing pins comprises:
      an annular ring; and
      a plurality of legs extending from the annular ring, wherein the annular ring is exposed through an outer surface of the main body, and wherein the plurality of legs extend into the main body, wherein the annular ring adhesively bonds via curing to another annular ring of the other composite fiber layer.

2. The composite fiber layer of claim 1, wherein the main body is pre-impregnated with at least one resin.

3. The composite fiber layer of claim 1, wherein the main body includes first and second opposed surfaces separated by a thickness, wherein each of the plurality of layer-securing pins extends through only one of the first or second opposed surfaces.

4. The composite fiber layer of claim 1, wherein each of the plurality of layer-securing pins comprises a linear structure.

5. The composite fiber layer of claim 1, wherein each of the plurality of layer-securing pins further comprises a linear exposed end extending outwardly from the main body.

6. The composite fiber layer of claim 1, wherein each of the plurality of layer-securing pins includes first and second portions that exhibit different coefficients of thermal expansion.

7. The composite fiber layer of claim 1, wherein each of the plurality of layer-securing pins is formed of a shape memory alloy.

8. The composite fiber layer of claim 7, wherein each of the plurality of layer-securing pins is curled at a first temperature, and wherein each of the plurality of layer-securing pins is configured to be straightened at a second temperature that differs from the first temperature.

9. The composite fiber layer of claim 1, wherein each of the plurality of legs is formed of a bimetallic material.

10. A layered composite assembly that couples to an adjacent composite layer, the layered composite assembly comprising:
    a plurality of composite fiber layers stacked onto one another, each of the plurality of composite fiber layers comprising:
       a main body including a plurality of composite fibers, wherein the main body is pre-impregnated with at least one resin; and
       a plurality of layer-securing pins secured to the main body, wherein the plurality of layer-securing pins are separate and distinct from one another, wherein the plurality of layer-securing pins are configured to mechanically connect the main body to the adjacent composite fiber layer, wherein each of the plurality of layer-securing pins comprises: (a) an annular ring; and (b) a plurality of legs extending from the annular ring, wherein the annular ring is exposed through an outer surface of the main body, and wherein the plurality of legs extend into the main body, and wherein the annular ring is adhesively bonded via curing to another annular ring of the adjacent composite fiber layer.

11. The layered composite assembly of claim 10, further comprising at least one laminate layer secured around an outer one of the plurality of composite fiber layers.

12. The layered composite assembly of claim 10, wherein each of the plurality of layer-securing pins is formed of a shape memory alloy, wherein each of the plurality of layer-securing pins is formed in a curled shaped at a first temperature, wherein each of the plurality of layer-securing pins is cooled to a second temperature that differs from the first temperature, wherein each of the plurality of layer-securing pins is mechanically straightened at a second temperature, wherein each of the plurality of layer-securing pins is secured to the main body in a straightened orientation, and wherein each of the plurality of layer-securing pins transitions to a curled orientation to hook onto one or more of the plurality of composite fibers.

13. The layered composite assembly of claim 10, wherein each of the plurality of layer-securing pins includes an inner portion formed of a first metal and an outer portion formed of a second metal that is different than the first metal, wherein the first and second metals exhibit different coefficients of thermal expansion, wherein each of the plurality of layer-securing pins is curled at a first temperature, wherein each of the plurality of layer-securing pins is configured to be straightened at a second temperature that differs from the first temperature, wherein each of the plurality of layer-securing pins is secured to the main body in a straightened orientation, and wherein each of the plurality of layer-securing pins transitions to a curled orientation to hook onto one or more of the plurality of composite fibers.

14. A method of forming a layered composite assembly, the method comprising:
    stacking a plurality of composite fiber layers, wherein each of the composite fiber layers includes a main body including a plurality of composite fibers that are pre-impregnated with at least one resin, and a plurality of layer-securing pins; and
    mechanically connecting the plurality of layer-securing pins of each of the plurality of composite fiber layers with another of the plurality of composite fiber layers wherein the plurality of layer-securing pins are separate and distinct from one another, wherein the mechanically connecting operation comprises:
       abutting exposed portions of rings of the plurality of layer-securing pins of the plurality of composite fiber layers together; and
       adhesively bonding, via curing, the abutting exposed portions of the rings of the plurality of layer-securing pins of the plurality of composite fiber layers together.

15. The method of claim 14, wherein the mechanically connecting operation comprises:
    exposing the plurality of composite fibers layers to a change in one or both of temperature or pressure; and
    transitioning the plurality of layer-securing pins between straightened and curled orientations through the exposing operation.

* * * * *